United States Patent [19]

Nakamura

[11] Patent Number: 4,871,624
[45] Date of Patent: Oct. 3, 1989

[54] MAGNETIC SCALE AND METHOD OF MANUFACTURING THE SAME
[75] Inventor: Hiromi Nakamura, Zama, Japan
[73] Assignee: Toshiba Kikai Kabushiki Kaisha, Tokyo, Japan
[21] Appl. No.: 158,707
[22] Filed: Feb. 22, 1988
[51] Int. Cl.⁴ .............................................. C21D 1/09
[52] U.S. Cl. ................................... 428/611; 148/306; 148/903
[58] Field of Search ................ 428/594, 611; 148/903, 148/12 A, 300, 306, 11.5 Q; 219/121 LM

[56] References Cited

U.S. PATENT DOCUMENTS 4,510,371 4/1985 Nakamura et al. ........... 219/121 LM
4,657,823 4/1987 Siemers et al. ...................... 428/611

Primary Examiner—S. Kastler
Attorney, Agent, or Firm—Banner, Birch, McKie & Beckett

[57] ABSTRACT

A magnetic scale includes a magnetic base member and a thin film formed on a surface of the magnetic member by plating or flame spraying nickle, chromium, manganese, silicon, boron, carbon, or a combination thereof. A laser beam or an arc discharge is applied to the outer circumferential surface of the thin film to fuse the metal of thin film and the metal of the base member under heat for thereby forming nonmagnetic modified portions on the surface of the base member.

19 Claims, 4 Drawing Sheets

MAGNETIC SCALE AND METHOD OF MANUFACTURING THE SAME

BACKGROUND OF THE INVENTION

The present invention relates to a magnetic scale and a method of manufacturing the same, and more particularly to a magnetic scale and a method of manufacturing the same by coating a ferromagnetic base member by flame spraying, plating, or the like, and heating the coated surface at spaced intervals with a laser beam to produce modified portions of a nonmagnetic material, so that magnetic and nonmagnetic areas are alternately defined.

Heretofore, magnetic scales are widely used in production sites or the like. One prior magnetic scale includes a ferromagnetic base member having a plurality of equally spaced grooves each having a width ranging from 1 to 2 mm and a depth ranging from 0.2 to 0.3 mm, the grooves being filled with chromium, for example, by plating. In the plating process, a chromium layer tends to concentrate on the outer corners of the grooves, but is apt to be less deposited on the bottoms of the grooves. As a result, the plated layer develops projections on the groove corners. The distance between the tip ends of the projections and the upper surfaces of the plated layer on the groove bottoms is increased to the extent which would make it difficult to plate the grooves. Therefore, it is customary to plate the grooves while removing the projections developed on the groove corners. The developed projections must however be removed repeatedly several times, sometimes up to ten times, until the grooves which are 0.2 to 0.3 mm deep are entirely filled up. Accordingly, the plating process is quite time-consuming and hence highly costly.

Another conventional process is to plate a nonmagnetic base member with nickel containing phosphorus, applying a laser beam to the plated surface layer at equally spaced intervals to heat the plated layer up to about 300° C. for thereby modifying the nickel layer into a ferromagnetic layer. Since the base member is plated over its entire surface, no such a complex procedure as required by the above prior plating process is necessary. However, the thickness of the plated layer is limited to 0.2 mm because of the bonding capability of the layer and the production efficiency.

It is confirmed that when a magnetic scale is employed to measure the amount of displacement of a plunger for forcing molten metal into a die cavity in a die casting machine, an electric output issued from a detector for detecting the amount of displacement is proportional to the thickness of the plated layer.

Therefore, the electric output cannot be increased substantially by the layer thickness of about 0.2 mm. Moreover, inasmuch as the plated layer is locally modified into the ferromagnetic layer by laser beam heating, when the magnetic scale in use is subjected to frictional heat or heated due for example to a machine failure, the characteristics of the magnetic scale, i.e., the electric output is lowered, and the magnetic scale fails to operate normally especially when its temperature approaches 300° C. Therefore, the magnetic scale only finds use in limited applications.

SUMMARY OF THE INVENTION

It is therefore a major object of the present invention to provide a magnetic scale which can be manufactured at a low cost, enables a detector to produce a high electric output, is resistant to heat, and can be used in a wide variety of applications.

Another object of the present invention is to provide a magnetic scale including a magnetic base member and a thin film formed on a surface of the magnetic member by plating or flame spraying nickel, chromium, manganese, silicon, boron, carbon, or a combination thereof. A laser beam or an arc discharge is applied to the outer circumferential surface of the thin film to fuse the metal of thin film and the metal of the base member under heat for thereby forming nonmagnetic modified portions on the surface of the base member.

Still another object of the present invention is to provide a magnetic scale comprising a magnetic base member and a thin film formed on a surface of the magnetic member by plating or flame spraying, the magnetic member having a plurality of nonmagnetic portions on the surface thereof at spaced intervals in a longitudinal direction of the base member, the nonmagnetic portions being formed by heating the thin film so as to be fused with the magnetic member.

Yet another object of the present invention is to provide a magnetic scale wherein the nonmagnetic portions are positioned at equally spaced intervals on the surface of the base member.

Yet still another object of the present invention is to provide a magnetic scale wherein the nonmagnetic portions are positioned at irregularly spaced intervals on the surface of the base member.

A further object of the present invention is to provide a magnetic scale wherein the base member is of a cylindrical shape, the nonmagnetic portions being of a ring shape extending circumferentially around the base member.

A still further object of the present invention is to provide a magnetic scale wherein adjacent ones of the nonmagnetic portions are of different widths in the longitudinal direction of the base member.

A yet further object of the present invention is to provide a magnetic scale wherein the base member is of steel.

A yet still further object of the present invention is to provide a magnetic scale wherein the steel contains chromium.

Another object of the present invention is to provide a magnetic scale wherein the thin film is of plated nickel and/or plated chromium.

Still another object of the present invention is to provide a magnetic scale wherein the thin film is formed by flame spraying at least nickel, chromium, manganese, silicon, boron, carbon, or a combination thereof.

Yet still another object of the present invention is to provide a magnetic scale wherein the magnetic scale is incorporated in a die casting machine for detecting the amount of movement of a plunger thereof.

It is also an object of the present invention to provide a method of manufacturing a magnetic scale, comprising the steps of: forming a thin film on a surface of a magnetic base member; displacing heating means for generating a heating beam and the base member relatively to each other to cause the heating beam to be applied intermittently to the thin film; fusing the base member and the thin film under heat with the heating beam to form a plurality of spaced nonmagnetic portions; and removing the thin film from areas free from exposure to the heating beam from the heating means to expose the nonmagnetic portions on the surface of the base member.

A further object of the present invention is to provide a method of manufacturing a magnetic scale, wherein the thin film is formed by plating on the base member.

A still further object of the present invention is to provide a method of manufacturing a magnetic scale, wherein the thin film is formed by plating nickel or chromium on the base member.

A yet further object of the present invention is to provide a method of manufacturing a magnetic scale, wherein the thin film is formed by flame spraying on the base member.

A yet still further object of the present invention is to provide a method of manufacturing a magnetic scale, wherein the thin film is formed by flame spraying powder of at least nickel, chromium, manganese, silicon, boron, carbon, or a combination thereof on the surface of the base member.

Another object of the present invention is to provide a method of manufacturing a magnetic scale, wherein the heating means comprises a laser beam source.

Still another object of the present invention is to provide a method of manufacturing a magnetic scale, wherein the laser beam source comprises a carbon dioxide gas laser.

Yet another object of the present invention is to provide a method of manufacturing a magnetic scale, wherein the heating means comprises a tungsten-inert gas arc welding apparatus.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
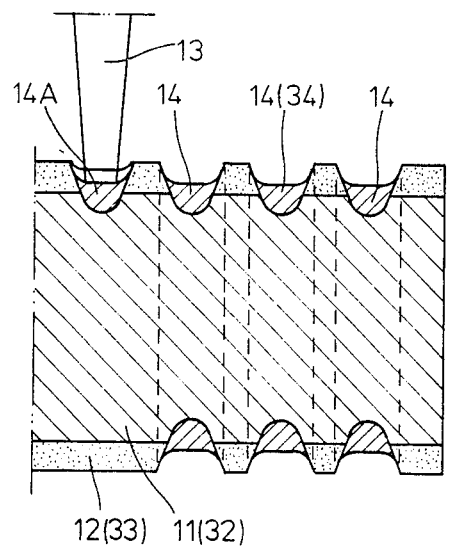
FIG. 1 is a fragmentary cross-sectional view showing a process in which a laser beam is applied to a thin film on a base member to form modified portions.

As shown in FIG. 1, a thin film 12 of nickel, chromium, manganese, carbon, or the like is deposited on the surface of a cylindrical and ferromagnetic base member 11 (having a magnetic permeability of about 2,000) by plating, flame spraying, or the like. Then, a laser beam 13 is applied to the thin film 12 to heat and melt the base member 11 and the thin film 12 at localized areas for thereby fusing the metal of the thin film 12 and the metal of the base member 11, thus producing a nonmagnetic modified portion 14A (having a magnetic permeability of about 2). By rotating the base member 11 about its longitudinal axis while the laser beam 13 is being applied, the modified portion 14A takes on a ring form. Thereafter, the laser beam 13 is displaced a certain distance axially relatively to the base member 11 and then applied thereto. The above process is repeated to form a plurality of axially spaced ring-shaped modified portions 14 in the base member 11.

In order to provide the nonmagnetic modified portions 14, the metal contained in the modified portions 14 should be of stable austenite as indicated in the Schaeffler constitution diagram. Therefore, when the base member 11 contains a large amount of nickel, chromium, manganese, or the like, the metal of the thin film 12 should be selected in view of the material of the base member 11.

Figure 2:
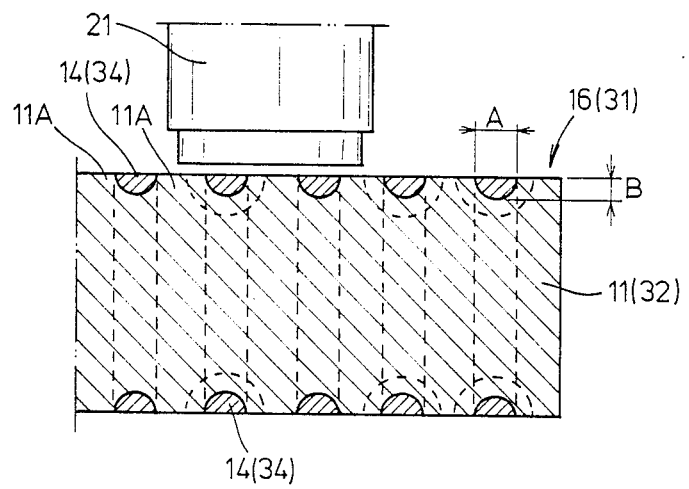
FIG. 2 is a fragmentary cross-sectional view showing a magnetic scale produced by removing the thin layer from the structure of FIG. 1 after the laser beam application, with a detector positioned in confronting relation to the magnetic scale.

FIG. 2 shows the base member 11 from which the outer thin film 12 has been removed as by grinding, providing a magnetic scale 16. The magnetic scale 16 includes inter-surface-layer portions 11A where the ferromagnetic base member 11 is exposed, and the nonmagnetic modified portions 14, the portions 11A, 14 being alternately positioned with their width and pitch being equal. In the vicinity of the magnetic scale 16, there is located a detector 21 which is moved horizontally in FIG. 2 to detect the ferromagnetic inter-surface-layer portions 11A and the nonmagnetic modified portions 14 for thereby generating an electric signal corresponding to the inter-surface-layer portions 11A and the modified portions 14, i.e, an electric signal representative of the amount of horizontal displacement. Thus, the amount of displacement can be measured.

Figure 4:
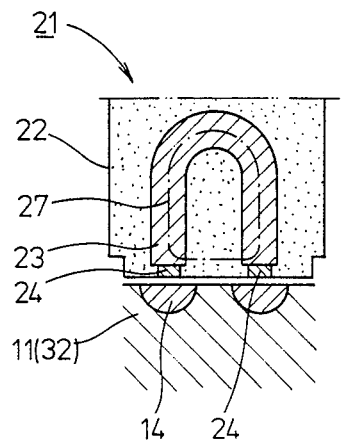
FIGS. 3 and 4 are fragmentary cross-sectional views illustrating the detector displaced to confront magnetic and nonmagnetic areas, respectively.

The detector 21 will be described by way of example with reference to FIGS. 3 through 5. The detector 21 has a main body 22 in which there is inserted a U-shaped permanent magnet 23 with its two legs spaced a distance equal to the pitches of the inter-surface-layer portions 11A and the modified portions 14. Two magnetoresistor elements (hereinafter referred to simply as "elements") 24 of small length are disposed between the opposite ends of the permanent magnet 23 and a surface of the main body 22. The elements 24 are a kind of electric resistor with its electric resistance increasing in proportion to lines of magnetic force passing therethrough.

Figure 3:
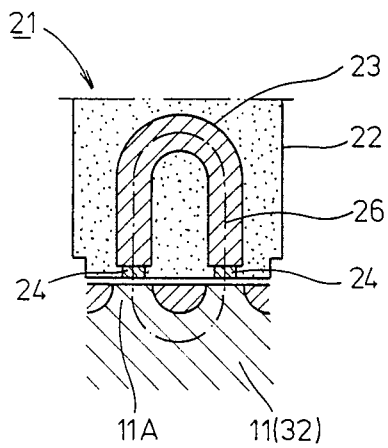

When ferromagnetic inter-surface-layer portions 11A of higher magnetic permeability are positioned directly in front of the elements 24 as shown in FIG. 3, lines of magnetic force from the permanent magnet 23 pass through a path 26, and many lines of magnetic force pass through the elements 24, resulting in an increase in the electric resistance of the elements 24. When modified portions 14 of lower magnetic permeability are positioned directly in front of the elements 24 as shown in FIG. 4, lines of magnetic force from the permanent magnet 23 pass through a path 27, and almost no lines of magnetic force pass through the elements 24. Thus, the electric resistance of the elements 24 is low.

Figure 5:
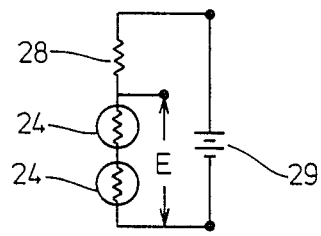
FIG. 5 is a circuit diagram of an electric circuit of the detector.

As illustrated in FIG. 5, the two elements 24 and a resistor 28 are connected in series to a power supply 29. When the resistance of the elements 24 is larger, the voltage E across the elements 24 is higher, and when the resistance of the elements 24 is smaller, the voltage E across the elements 24 is lower. Therefore, the output voltage E of the detector 21 varies dependent on the relative displacement between the magnetic scale 16 and the detector 21. The output voltage E may then be processed by an electric processor (not shown) to determine the amount of relative displacement, the relative speed, and the relative acceleration.

Examples of the base member and the thin film will be described below. Example 1

The base member 11 was made of steel (SUS420J2, having a magnetic permeability ranging from 3,000 to 4,000), and the thin film 12 was formed of nickel on the surface of the base member 11 by plating up to a thickness of 0.03 mm. Thereafter, the base member 11 was rotated at a speed of 2 m/minute while a carbon dioxide gas laser beam having a beam diameter of 1.3 mm produced at an output of 1.6 kW was being applied to the base member 11 to fabricate the magnetic scale 16 as shown in FIG. 2. The dimensions A, B of the modified portions 14 indicated in FIG. 2 were 1 mm and 0.3 mm, respectively. Since the steel material (SUS420J2) contains a large amount, i.e., 13 wt%, of chromium, the thin film 12 could be formed simply by plating nickel.

EXAMPLE 2

A magnetic scale 31 included a base member 32 made of steel (S48C, having a magnetic permeability ranging from 3,000 to 4,000), and a thin film 33 was formed on the surface of the base member 32 by plating, the thin film 33 being composed of double layers including a plated nickel layer having a thickness of 0.03 mm and a plated chromium layer having a thickness of 0.02 mm. While the base member 2 was being rotated at a speed of 2 m/minute, a carbon dioxide gas laser beam having a beam diameter of 1.3 mm produced at an output of 2 kW was applied to the base member 32. Then, the thin film 33 was removed. The dimensions A, B of the modified portions 14 were 1 mm and 0.3 mm, respectively, as is the case with the Example 1.

EXAMPLE 3

Figure 6:
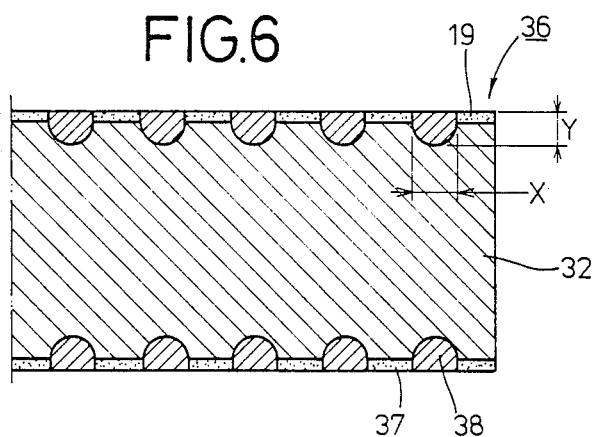
FIG. 6 is a fragmentary cross-sectional view of a base member and modified portions according to another embodiment of the present invention.

A magnetic scale according to this Example is required to have a surface of high wear resistance, and is used as a mechanical component itself. As shown in FIG. 6, a magnetic scale 36 included a base member 32 made of steel (S48C), and a thin film 37 was formed on the surface of the base member 32 by flame spraying up to a thickness of 0.2 mm, the thin film 37 being made of an autogenous alloy of 65 wt% of nickel, 20 wt% of chromium, 10 wt% of silicon, and 5 wt% of boron. While the base member 32 was being rotated at a speed of 1.5 m/minute, a carbon dioxide gas laser beam having a beam diameter of 1.3 mm produced at an output of 2 kW was applied to the base member 32. Thereafter, the thin film 37 was ground off, leaving a 0.01-mm layer thereof. The dimensions X, Y of modified portions 38 shown in FIG. 6 were 1 mm and 0.5 mm, respectively.

EXAMPLE 4

Figure 7:
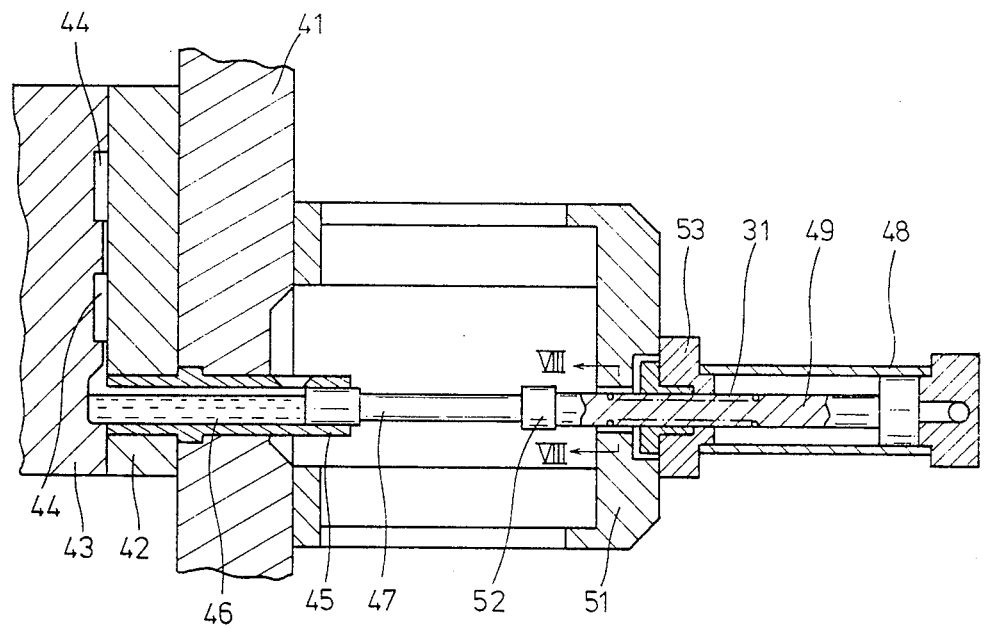
FIG. 7 is a fragmentary vertical cross-sectional view of a die casing machine with which a magnetic scale of the present invention is used.
Figure 8:
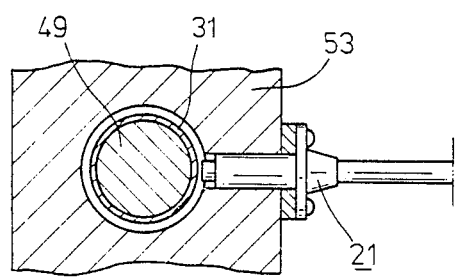
FIG. 8 is a cross-sectional view taken along line VIII—VIII of FIG. 7.

According to this Example, the magnetic scale 31 indicated in the Example 2 above is used with a die casting machine as shown in FIGS. 7 and 8. Cavities 44 are defined between a fixed die 42 mounted on a fixed die plate 41 and a movable die 43 secured to a movable die plate (not shown). A barrel 45 is attached to the fixed die plate 41 and the fixed die 42. Molten metal 46 in the barrel 45 is forced into the cavities 44 by a plunger 47 moved (to the left in FIG. 7) into the barrel 45, thus producing a die-cast product.

To produce a high-quality die casting, the condition in which the molten metal 46 is forced into the cavities 44, i.e., the movement of the plunger 47 should be controlled. To effect such control, the magnetic scale 31 is integrally formed on a piston rod 49 of a hydraulic cylinder 48 which moves the plunger 47. The hydraulic cylinder 48 is fixedly mounted on the fixed die plate 41 by a frame 51. The plunger 47 is connected to the piston rod 49 by a coupling 52. The hydraulic cylinder 48 is closed off at one end by a cover 53.

The movement of the plunger 47 and hence the piston rod 49 is detected by the detector 21, which applies its output signal to a control unit (not shown) for controlling the movement of the plunger 47. The speed of movement of the plunger 47 ranges from 2 to 3 m/second. When the molten metal 46 is completely fed into the cavities 44, the plunger 47 is quickly stopped at a deceleration reaching 50 G.

While the modified portions are ring-shaped in the above description, the base member may be in the form of a flat plate and linear modified portions may be formed on the surfaces of the base member. Although the width of each of the modified portions was 1 mm in the above. Examples, it may be greater or smaller dependent on the use to which the magnetic scale is to put, by altering the beam diameter of the laser beam. Rather than being spaced at equal intervals, the modified portions and the intersurface-layer portions may be in the pattern of a bar code as indicated by the broken lines in FIG. 2 for detecting a reading position.

EXAMPLE 5

Figure 9:
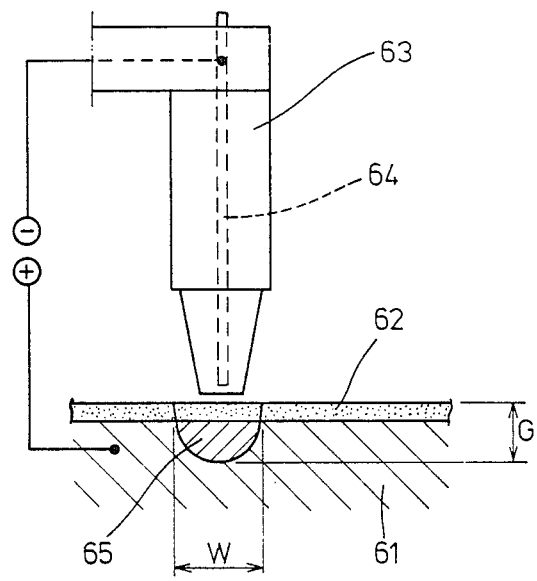
FIG. 9 is a fragmentary cross-sectional view of a base member with a thin film thereon in which a modified portion is formed by an arc welding apparatus according to still another embodiment of the present invention.

In the Examples 1 through 3 above, the laser beam source was employed as a heat source for producing the modified portions. In the Example 5, a tungsten-inert gas (TIG) arc welding apparatus of positive polarity which is capable of melting a material to a large depth is used as a heat source. As illustrated in FIG. 9, a ferromagnetic base member 61 and a thin film 62 of plated nickel or the like serve as an anode, whereas an electrode 64 of a torch 63 serves as a cathode. When an arc discharge is produced between the anode and the cathode, portions of the thin film 62 and the base member 61 are melted to form nonmagnetic modified portions 65 which are the same as those in the previous Examples. Since the TIG arc welding apparatus can supply a large amount of concentrated thermal energy, the dimensions W, G of each modified portion 65 are large, i.e., in the ranges of from 2 to 3 mm and from 1.5 to 2 mm, respectively. Thereafter, the thin film 62 is grooves off to form a magnetic scale (not shown).

Figure 10:
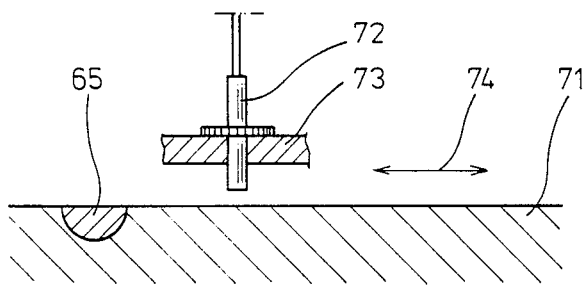
FIG. 10 is a fragmentary cross-sectional view of a positioning device employing a magnetic scale of the present invention.

The Example 5 is suitable for use as a large-size magnetic scale or in a positioning device as shown in FIG. 10. In FIG. 10, a detector 72 such as a reed switch, for example, is mounted on a support 73 in the vicinity of a magnetic scale 71 for detecting a nonmagnetic body.

When the magnetic scale 71 or the detector 72 is moved in the direction of the arrow 74, they are displaced relatively to each other. At the time the modified portion 65 faces the detector 72, the detector 72 produces an electric signal to detect the position of the magnetic scale 71. The magnetic scale 71 can easily be attached to a flat or cylindrical surface of a mechanical component. The positioning device employing the magnetic scale 71 may be smaller in size than a conventional positioning device comprising a limit switch and a dog.

Heretofore, a number of grooves are machined in a ferromagnetic member and plated with a nonmagnetic material. Since projections produced when plating the grooves have to be removed repeatedly and many plating cycles must be carried out, the cost of manufacturing a conventional magnetic scale has been high. According to the present invention, however, a ferromagnetic base member is plated all over its surface, and then heat-treated by a laser beam or the like to produce nonmagnetic modified portions. As a result, a magnetic scale can be manufactured at a reduced cost.

The electric output and heat resistance of the conventional magnetic scale are greatly lowered when the ambient temperature is increased. The electric output and heat resistance of the magnetic scale according to the present invention are not reduced even upon an ambient temperature increase since the nonmagnetic modified portions are of stable austenite. The prior magnetic scale is mounted on an arm attached to a movable body, and hence tends to be easily broken or damaged when subjected to large acceleration. To avoid this difficulty, a large mechanism is required which results in an increased cost and cannot easily be operated. With the present invention, inasmuch as a movable body may be converted into a magnetic scale, it will not be broken or damaged no matter how it may be accelerated. Furthermore, the thickness of the nonmagnetic modified portions of the present invention may be increased by using an arc discharge, so that the output of the detector may be increased for a better SN ratio.

Although a certain preferred embodiment has been shown and described, it should be understood that many changes and modifications may be made therein without departing from the scope of the appended claims.

What is claimed is:

1. A scale comprising a magnetic base member and a thin film formed on a surface of said magnetic member by plating or flame spraying, said magnetic member having a plurality of nonmagnetic portions on the surface thereof at spaced intervals in a longitudinal direction of said base member, said nonmagnetic portions comprising a fused member formed by heating said thin film so as to be fused with said magnetic member.

2. A magnetic scale according to claim 1, wherein said nonmagnetic portions are positioned at equally spaced intervals on the surface of said base member.

3. A magnetic scale according to claim 1, wherein said nonmagnetic portions are positioned at irregularly spaced intervals on the surface of said base member.

4. A magnetic scale according to any of claims 1 through 3, wherein said base member is of a cylindrical shape, said nonmagnetic portions being of a ring shape extending circumferentially around said base member.

5. A magnetic scale according to any of claims 1 through 3, where in adjacent ones of said nonmagnetic portions are of different widths in the longitudinal direction of said base member.

6. A magnetic scale according to any of claims 1 through 3, wherein said base member is of steel.

7. A magnetic scale according to claim 6, wherein said steel contains chromium.

8. A magnetic scale according to claim 1, wherein said thin film is of plated nickel, plated chromium, or a combination of plated nickel and plated chromium.

9. A magnetic scale according to claim 1, wherein said thin film is formed by flame spraying at least nickel, chromium, manganese, silicon, boron, carbon, or a combination thereof.

10. A magnetic scale according to claim 1, wherein said magnetic scale is incorporated in a die casting machine for detecting the amount of movement of a plunger thereof.

11. A method of manufacturing a magnetic scale, comprising the steps of: forming a thin film on a surface of a magnetic base member; displacing heating means for generating a heating beam and said base member relatively to each other to cause the heating beam to be applied intermittently to said thin film; fusing said base member and said thin film under heat with said heating beam to form a plurality of spaced nonmagnetic portions; and removing the thin film from areas free from exposure to the heating beam from the heating means to expose said nonmagnetic portions on the surface of said base member.

12. A method according to claim 11, wherein said thin film is formed by plating on said base member.

13. A method according to claim 12, wherein said thin film is formed by plating nickel or chromium on said base member.

14. A method according to claim 11, wherein said thin film is formed by flame spraying on said base member.

15. A method according to claim 14, wherein said thin film is formed by flame spraying powder of at least nickel, chromium, manganese, silicon, boron, carbon, or a combination thereof on the surface of said base member.

16. A method according to any of claims 11 through 15, wherein said heating means comprises a laser beam source.

17. A method according to claim 16, wherein said laser beam source comprises a carbon dioxide gas laser.

18. A method according to any of claims 11 through 15, wherein said heating means comprises a tungsten-inert gas arc welding apparatus.

19. A magnetic scale comprising a base member having a plurality of nonmagnetic portions at spaced intervals in the surface of said base member, said nonmagnetic portions having been made by a process comprising:

forming a thin film on the surface of said magnetic base member;

heating a portion of said thin film and said base member to fuse the thin film portion into said base member; and removing unfuxed thin film the surface of said base member.

* * * * *

UNITED STATES PATENT AND TRADEMARK OFFICE
CERTIFICATE OF CORRECTION

PATENT NO. : 4,871,624

DATED : October 3, 1989

INVENTOR(S) : Hiromi Nakamura

It is certified that error appears in the above-identified patent and that said Letters Patent is hereby corrected as shown below:

Column 5, line 43, "2" should be --32--.

Signed and Sealed this

Twenty-eighth Day of August, 1990

*Attest:*

HARRY F. MANBECK, JR.

*Attesting Officer*     *Commissioner of Patents and Trademarks*